United States Patent [19]
Kokie et al.

[11] 4,212,034
[45] Jul. 8, 1980

[54] SOLID-STATE IMAGE PICKUP DEVICE

[75] Inventors: Norio Kokie, Tokyo; Masaharu Kubo; Shusaku Nagahara, both of Hachioji, all of Japan

[73] Assignee: Hitachi, Ltd., Japan

[21] Appl. No.: 931,967

[22] Filed: Aug. 8, 1978

[30] Foreign Application Priority Data

Aug. 10, 1977 [JP] Japan .................. 52-95039

[51] Int. Cl.$^2$ .............................................. H04N 3/14
[52] U.S. Cl. ................................................. 358/213
[58] Field of Search ................... 358/209, 212, 213

[56] References Cited
U.S. PATENT DOCUMENTS

| | | | |
|---|---|---|---|
| 4,011,402 | 3/1977 | Kolke et al. | 358/213 |
| 4,031,315 | 6/1977 | Pfleiderer | 358/213 |
| 4,045,817 | 8/1977 | Nakatani et al. | 358/213 |

*Primary Examiner*—Richard Murray
*Attorney, Agent, or Firm*—Craig & Antonelli

[57] ABSTRACT

A solid-state image pickup device has a plurality of photoelectric conversion elements arranged in a two-dimensional pattern, to which horizontal and vertical switches are coupled for selecting the photoelectric conversion elements; horizontal and vertical scanning circuitry for turning the switches "on" and "off" are integrated on the same semiconductor substrate. In order to detect an image with low capacitive lag and high resolution power, the required minimum number (four) of switching elements, adapted to turn respective fields "on" and "off" in a predetermined combination, are connected to an output terminal of each of the unit circuits which constitute the vertical scanning circuit. Using an output scanning pulse from the vertical scanning circuit and a field pulse, interlaced scanning in which two row lines are simultaneously selected in one of the combinations differing for the respective fields is executed so as to derive an optical image through the vertical switches.

5 Claims, 4 Drawing Figures

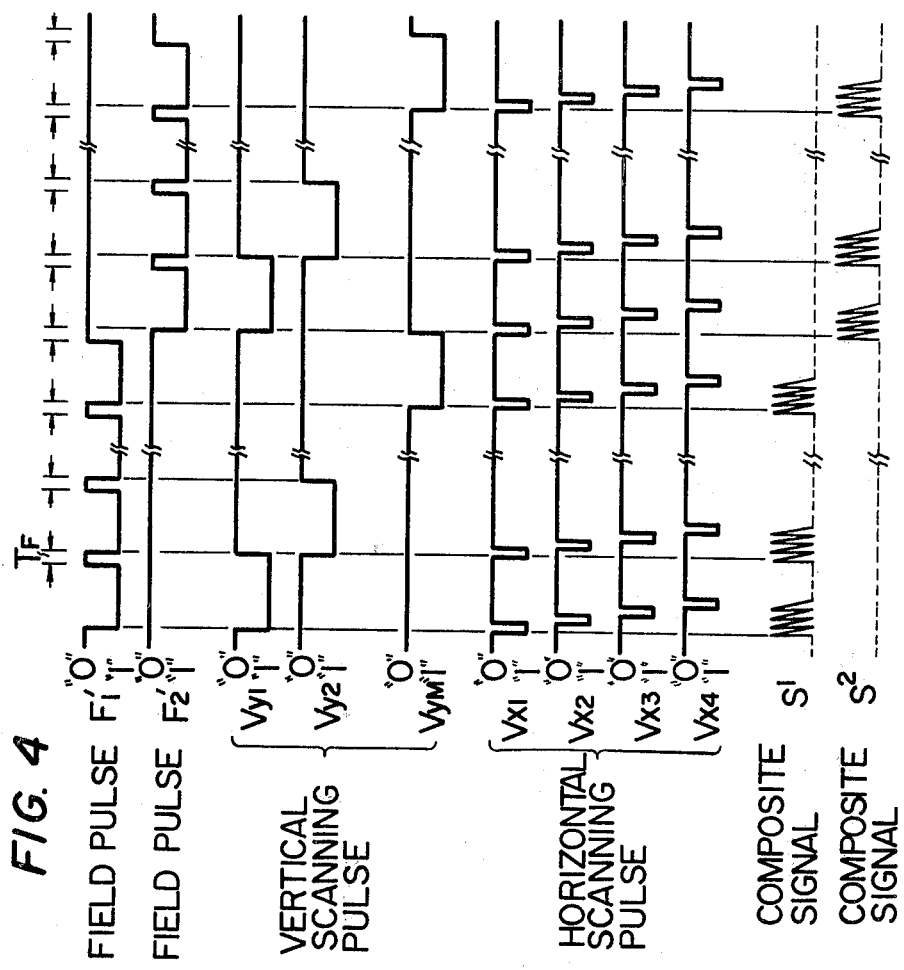

SOLID-STATE IMAGE PICKUP DEVICE

LIST OF PRIOR ART (37 CFR 1.56(a))

The following references are cited to show the state of the art:

Japanese Laid Open Patent Nos. 50-87723; 51-57123; and 52-24036.

BACKGROUND OF THE INVENTION

1. Field of the Invention

The present invention relates to a solid-state image pickup device in which a large number of photoelectric conversion elements and scanning circuits for deriving optical information of the respective elements are integrated on a semiconductor substrate.

2. Description of the Prior Art

A solid-state image pickup device converts two-dimensional optical information into electric signals in time sequence, employing photoelectric conversion and scanning.

A solid-state image pickup device should have a resolution power equivalent to that of an image pickup tube used in current television cameras. Therefore, at least 500×500 photoelectric conversion elements in the form of a matrix, switches for selecting (X, Y) coordinates corresponding to the elements, an X (horizontal) scanning circuit and a Y (vertical) scanning circuit which turn the switches "on" and "off" and each of which consists of at least 500 stages are required. Accordingly, a solid-state image pickup device is ordinarily fabricated by the use of the MOS LSI technology which can realize a high integration density comparatively easily.

In the standard television format, in order to narrow the video bandwidth and to obtain a picture with only slight flickering, one field is subjected to the interlaced scanning every horizontal scanning line (in the vertical direction), and one picture (one frame) is formed of two fields.

As formats for interlaced scanning, there have been proposed (i) a format wherein every second horizontal scanning line is selected in each field and (ii) a format wherein every two horizontal scanning lines are selected in one of the combinations differing for the respective fields (refer to Japanese Laid Open Patent No. 51-57123). According to the result of experiments carried out by the present inventors, it has been determined, for the former format, that the period of time during which optical information of respective picutre elements are stored becomes one frame period, the sensitivity being high, but that since the charges of picture elements which are not scanned and read out in the first field are derived later in the next field, a large lag occurs in a picture image which has an area larger than one picture element. Usually, in the image pickup tube, the signal quantity of the third field with light intercepted is called the lag. The aforecited lag phenomenon, however, may be considered as the lag of the initial (first) field and can be termed a "lag induced by the scanning format". It offends the eye considerably.

The cause for the lag phenomenon is that, since light charges in substantially equal amounts are read out in the first and second fields, the first field lag becomes 100%. In the case of an image pickup tube, interlacing is effected by electron beam scanning. There is no guarantee that the light charges of the picture elements for the succeeding field are not read in the preceding field. Rather, considerable components of the charges are read as the diameter of the electron beam becomes comparatively large. For this reason, the lag of the first field does not become so great as 100%. In the solid-state image pickup device, the light charges of the picture elements for the next field remain unread, so that the lag of the first field amounts to 100%.

With respect to the latter interlaced scanning format in which pairs of horizontal scanning lines are selected, it has been revealed that the period of time during which the optical information is stored becomes one field period, the sensitivity lowering to one half the sensitivity of the former format, but that, since the lag can be erased, a very good picture is obtained.

This interlaced scanning format, however, has been proposed recently. Any of vertical scanning circuits actualizing the format has a complicated circuit arrangement and the number of constituent elements of each stage of the vertical scanning circuit becomes large, which forms a serious hindrance to the practical use of the solid-state image pickup device endowed with the scanning function based on the present format. More specifically, it is the interlaced scanning circuit (vertical scanning circuit) having a large number of constituent elements that determines the number of picture elements which can be arranged in the Y (vertical) direction. Enhancement of the resolution power cannot be achieved unless the number of constituent elements of the interlaced scanning circuit (vertical scanning circuit) is diminished to the utmost and, simultaneously, the density of integration of the picture elements to be arrayed is increased so as to lower the arrayal pitch intervals of the picture elements.

SUMMARY OF THE INVENTION

An object of the present invention is to provide a solid-state image pickup device which is equipped with a simple interlaced scanning circuit having a small number of constituent elements for carrying out an interlaced scanning format capable of attaining a high picture quality (a format wherein two horizontal scanning lines are selected in one of different combinations of every field).

According to the invention, the required minimum number (four) of switching elements which are turned "on" and "off" in a predetermined combination, for every field, are connected to the output of each unit circuit constituting a vertical scanning circuit, thereby making it possible to perform interlaced scanning in which every two rows are scanned a combination differing for respective fields.

The other objects and features of the present invention will be apparent from the following detailed description when read in conjunction with the accompanying drawings.

BRIEF DESCRIPTION OF THE DRAWINGS

FIG. 4 is a timing chart showing operations of the image pickup device shown in FIG. 3.

DETAILED DESCRIPTION OF THE INVENTION

Figure 1:
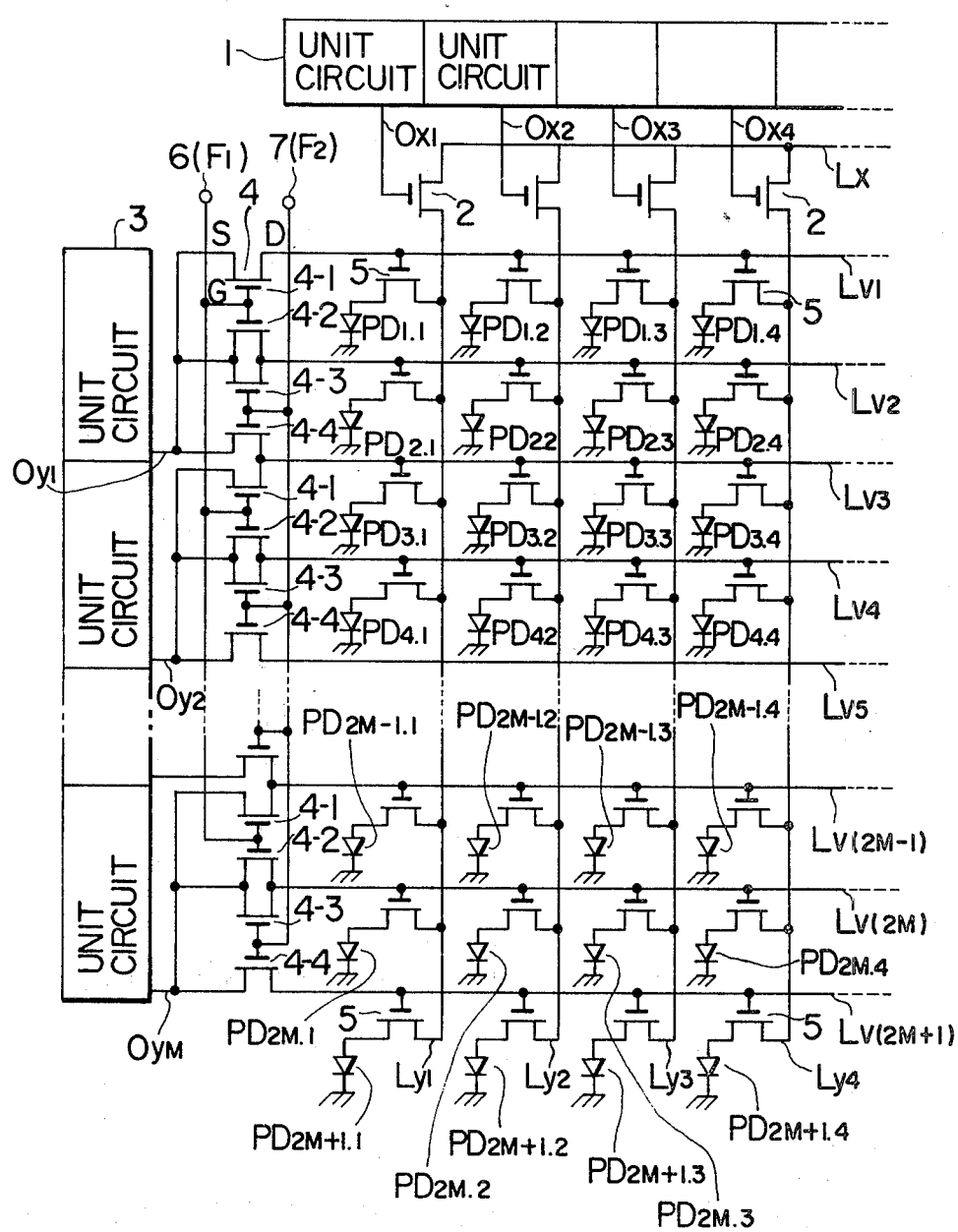
FIG. 1 shows an image pickup device according to the present invention.

FIG. 1 is a circuit diagram showing the construction of a solid-state image pickup device according to the invention. Referring to the Figure, numeral 1 designates a horizontal scanning circuit, which delivers scanning pulses for turning MOS field-effect transistors (hereinbelow, abbreviated as "MOSTs") 2 for horizontal switches "on" and "off". Numeral 3 indicates a vertical scanning circuit. Numeral 4 (4-1, 4-2, 4-3, and 4-4) denotes interlacing change-over switches (hereinafter, simply termed "switches") according to the invention. Used as the switches are MOSTs, which are connected at one end (e.g. sources S) to outputs $O_{y1}$, $O_{y2}$ ... $O_{yM}$ of unit circuits constituting the vertical scanning circuit 3 and at the other end (e.g. drains D) to vertical scanning pulse-applied lines $L_v$ ($L_{v1}$, $L_{v2}$, $L_{v3}$, $L_{v4}$, $L_{v5}$ ... $L_{v(2M-1)}$, $L_{v(2M)}$, and $L_{v(2M+1)}$) connecting the gates of the MOSTs for vertical switches 5 in common. One frame is composed of the two fields of a first field and a second field. The switches 4-1 and 4-2 are turned "on" and "off" by a first field pulse $F_1$ forming the first field impressed on an input terminal 6, while the switches 4-3 and 4-4 are turned "on" and "off" by a second field pulse $F_2$ forming the second field impressed on an input terminal 7. A generator (not shown) for generating the first field pulse $F_1$ and the second field pulse $F_2$ can be simply constructed by the use of flip-flop circuits, etc. PD indicates photodiodes which act as the sources of the MOSTs 5. $L_y$ ($L_{y1}$, $L_{y2}$, $L_{y3}$ ... ) denotes vertical signal output lines with the drains of the MOSTs 5 connected in common, and $L_x$ denotes a horizontal signal output line with the drains of the MOSTs 2 connected in common.

Figure 2:
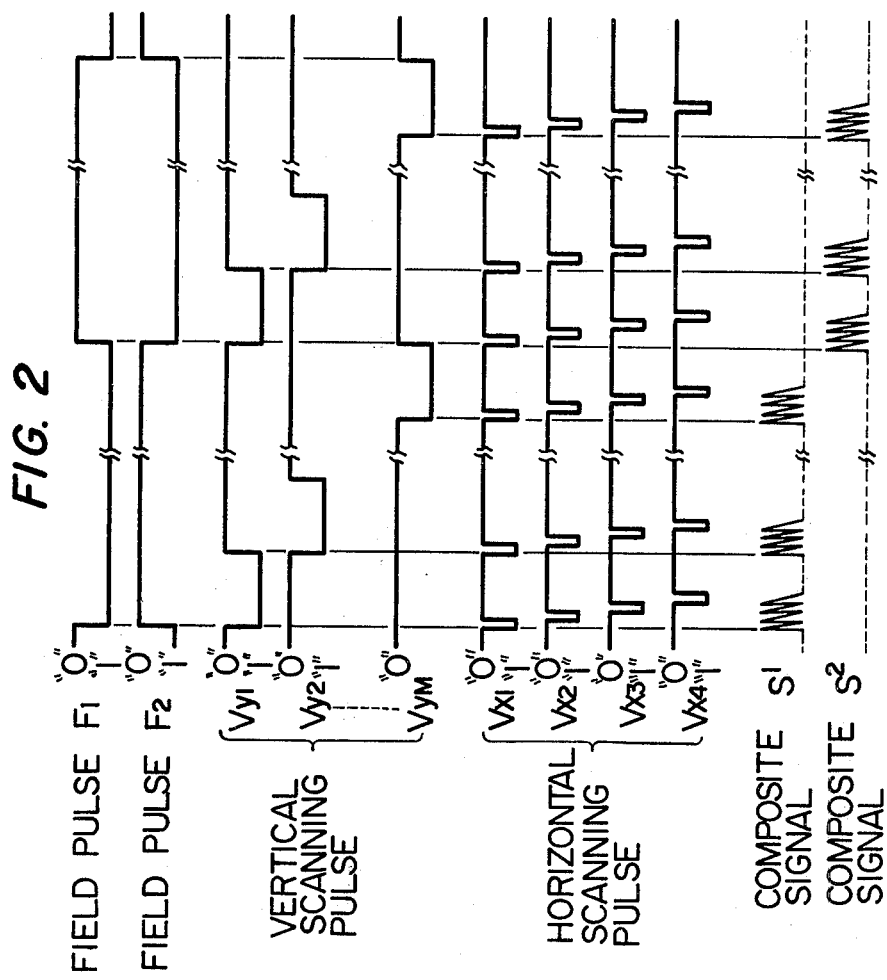
FIG. 2 is a timing chart showing operations of the image pickup device shown in FIG. 1.

Hereunder, the operation of the solid-state image pickup device according to the invention will be described with reference to a timing chart shown in FIG. 2. Here, the case where the constituent elements are P-channel MOSTs will be considered and the description will be based on negative logic (in which a high voltage of negative polarity is defined to be "1" and ground potential is defined to be "0"). By inverting the polarity, the same applies to N-channel MOSTs.

The vertical scanning circuit 3 successively delivers scanning pulses $V_{y1}$, $V_{y2}$ ... and $V_{yM}$, which are shifted by a fixed timing period from each other, to the outputs $O_{y1}$, $O_{y2}$ ... and $O_{yM}$ of the respective stages of the circuit 3 during one field, on the basis of clock pulses for driving the circuit 3. For operation at the standard TV frequency, the output frequency of the scanning pulses $V_{y1}$, $V_{y2}$ ... and $V_{yM}$ is 15.73kHz (period=64μs), and the recurrence frequency of the field pulses $F_1$ and $F_2$ is 60 Hz (period=16.7 ms). On the other hand, the horizontal scanning circuit 1 delivers scanning pulses $V_{x1}$, $V_{x2}$, $V_{x3}$, $V_{x4}$ ... to the outputs $O_{x1}$, $O_{x2}$, $O_{x3}$, $O_{x4}$ ... of the respective stages of unit circuits constituting the circuit 1. The output frequency ($f_c$) of the scanning pulses $V_{x1}$, $V_{x2}$, $V_{x3}$, $V_{x4}$ ... depends upon the number of picture elements (N) arranged in the horizontal direction, and it is given as the inverse number of a value obtained in such a way that a period resulting by subtracting a horizontal blanking period ($T_{BL}$) from one horizontal scan period (64μs) is divided by the number of picture elements ($f_c=1/(64-T_{BL}/N)$). A position (X,Y) is defined by the two vertical and horizontal scanning pulses, and the light signal charges which the photodiodes PD have stored during one field period are sequentially read out onto the common output line $L_X$ through the vertical switches 5 as well as the horizontal switches 2.

Here, in the first field, the first field pulse $F_1$ is impressed on the gates of the switches 4-1 and 4-2 through the input terminal 6. Therefore, the switches 4-1 and 4-2 are maintained in the conductive state, and a pair of scanning pulse-applied lines ($L_{v1}$, $L_{v2}$), ($L_{v3}$, $L_{v4}$) ... ($L_{v(2m-1)}$, $L_{v(2M)}$) are respectively coupled to the outputs $O_{y1}$, $O_{y2}$, $O_{y3}$ ... $O_{yM}$ of the stages of the vertical scanning circuit. In the first field, accordingly, "add" signals $(S_{1,1}{}^1+S_{2,1}{}^1)$, $(S_{1,2}{}^1+S_{2,2}{}^1)$, $(S_{1,3}{}^1+S_{2,3}{}^1)$, $(S_{1,4}{}^1+S_{2,4}{}^1)$ ... of respective pairs of photodiodes ($PD_{1,1}$, $PD_{2,1}$), ($PD_{1,2}$, $PD_{2,2}$), ($PD_{1,3}$, $PD_{2,3}$), ($PD_{1,4}$, $PD_{2,4}$) ... are sequentially derived onto the common signal output line $L_x$ during the period in which the vertical scanning pulse $V_{y1}$ is impressed. "Add" signals $(S_{3,1}{}^1+S_{4,1}{}^1)$, $(S_{3,2}{}^1+S_{4,2}{}^1)$, $(S_{3,3}{}^1+S_{4,3}{}^1)$, $(S_{3,4}{}^1+S_{4,4}{}^1)$ ... of photodiodes ($PD_{3,1}$, $PD_{4,1}$), ($PD_{3,2}$, $PD_{4,2}$), ($PD_{3,3}$, $PD_{4,3}$), ($PD_{3,4}$, $PD_{4,4}$) ... are sequentially derived onto the common signal output line $L_x$ during the period in which the scanning pulse $V_{y2}$ is impressed. "Add" signals $(S_{2M-1,1}{}^1+S_{2M,1}{}^1)$, $(S_{2M+1,2}{}^1+S_{2M,2}{}^1)$, $(S_{2M-1,3}{}^1+S_{2M,3}{}^1)$, $(S_{2M-1,4}{}^1+S_{2M,4}{}^1)$ ... of photodiodes ($PD_{2M-1,1}$, $PD_{2M,1}$), ($PD_{2M-1,2}$, $PD_{2M,2}$), ($PD_{2M-1,3}$, $PD_{2M,3}$), ($PD_{2M-1,4}$, $PD_{2M,4}$) ... are derived onto the common signal output line $L_x$ in the period during which the scanning pulse $V_{yM}$ is impressed. On the other hand, in the second field, the second field pulse $F_2$ is impressed on the gate of the switches 4-3 and 4-4 through the input terminal 7. Therefore, the switches 4-3 and 4-4 are maintained in the conductive state (the switches 4-1 and 4-2 are held in the nonconductive state), and a pair of scanning pulse-applied lines ($L_{v2}$, $L_{v3}$), ($L_{v4}$, $L_{v5}$) ... ($L_{v2M}$, $L_{v2M+1}$) are respectively coupled to the outputs $O_{y1}$, $O_{y2}$, $O_{y3}$, ... $O_{yM}$ of the stages of the circuit 3. In the second field, accordingly, by operations similar to those explained as to the first field, "add" signals $(S_{2,1}{}^2+S_{3,1}{}^2)$, $(S_{2,2}{}^2+S_{3,2}{}^2)$, $(S_{2,3}{}^2+S_{3,3}{}^2)$, $(S_{2,4}{}^2+S_{3,4}{}^2)$ ... are sequentially derived onto the signal output line $L_x$ during the period of the impression of the scanning pulse $V_{y1}$; "add" signals $(S_{4,1}{}^2+S_{5,1}{}^2)$, $(S_{4,2}{}^2+S_{5,2}{}^2)$, $(S_{4,3}{}^2+S_{5,3}{}^2)$, $(S_{4,4}{}^2+S_{5,4}{}^2)$ ... are sequentially derived onto the signal output line $L_x$ during the period of the impression of the scanning pulse $V_{y2}$; and "add" signals $(S_{2M,1}{}^2+S_{2M+1,1}{}^2)$, $(S_{2M,2}{}^2+S_{2M+1,2}{}^2)$, $(S_{2M,3}{}^2+S_{2M+1,3}{}^2)$, $(S_{2M,4}{}^2+S_{2M+1,4}{}^2)$ ... are sequentially derived onto the signal output line $L_x$ during the period of the impression of the scanning pulse $V_{yM}$.

According to the above operations, picture elements in the $(2M+1)^{th}$ row and picture elements in the first row are not selected during the first field and during the second field respectively. Therefore, the period of time for which the first row and the $(2M+1)^{th}$ row store optical information doubles, and signals which are greater than those of the picture elements in the other rows appear. Regarding these signals, no problem is posed because the selection period of each of the first row and the $(2M+1)^{th}$ row can be covered within a vertical blanking period (usually, about 3 ms=usually, about 40 scanning lines) provided every field.

Figure 3:
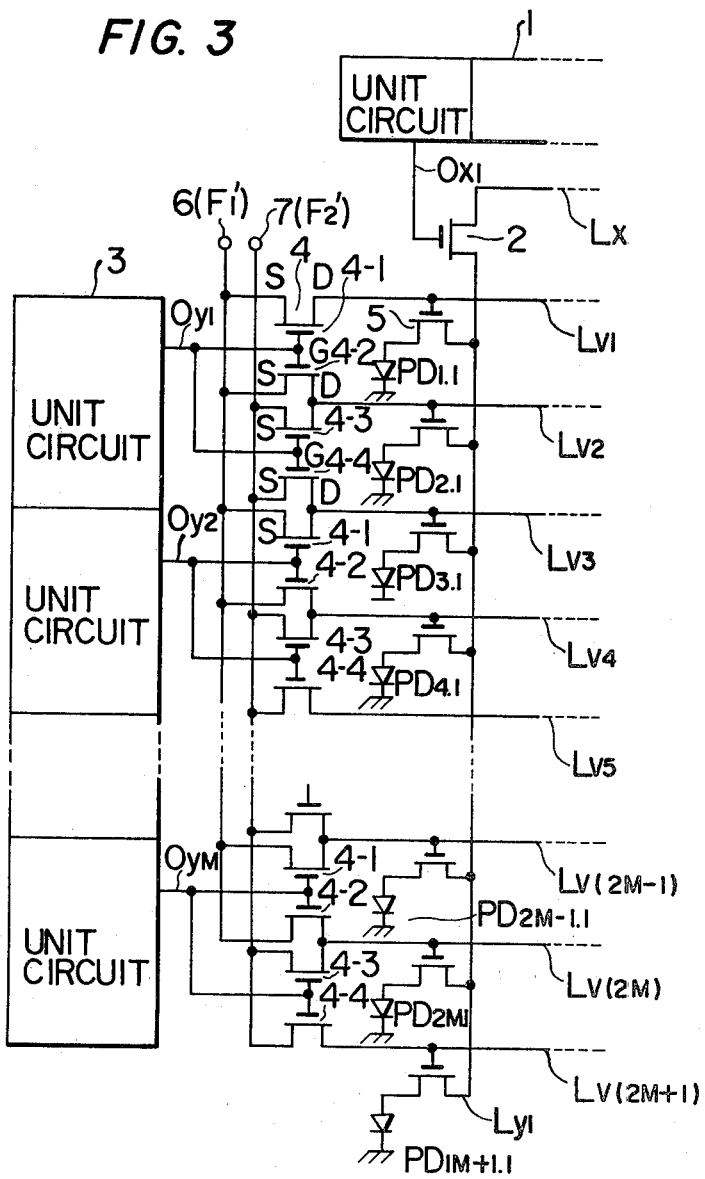
FIG. 3 is a circuit diagram of an image pickup device showing another embodiment of the present invention.

FIG. 3 shows another embodiment of the solid-state image pickup device according to the invention. Here, for the sake of brevity, the photodiodes PD and the MOSTs 5 are shown in only one column for illustrating the construction of the present device, the other columns being omitted. The same symbols as in FIG. 1 indicate the same or equivalent parts. The interlacing change-over switches 4 (4-1, 4-2, 4-3, and 4—4) have their gates connected to the outputs $O_{y1}$, $O_{y2}$ . . . and $O_{yM}$ of the respective unit circuits constituting the vertical scanning circuit 3, and are successively turned "on" and "off" by vertical scanning pulses $V_{y1}$, $V_{y2}$ . . . and $V_{yM}$. A first field pulse $F_1'$ is impressed on the input terminal 6, while a second field pulse $F_2'$ is impressed on the input terminal 7. The switches 4-1 and 4-2 are connected at one end (e.g. sources) to the first field pulse terminal 6 and at the other end (e.g. drains) to the vertical scanning pulse-applied lines $L_y$. The switches 4-3 and 4—4 are connected at one end (e.g. sources) to the second field pulse terminal 7 and at the other end (e.g. drains) to the vertical scanning pulse-applied lines $L_y$. In the present embodiment, when the read-out of the last picture element of a selected row has been completed, the switch of the photodiode read-out must be returned to the nonconductive state in order that the photodiode may store optical information entering in the next field period, and the voltage of the corresponding scanning pulse-applied line $L_v$ must be returned to the "0" level. As shown in a timing chart of FIG. 4, therefore, the voltages of the field pulses $F_1'$ and $F_2'$ must be at the "0" level for a predetermined period $T_F$ earlier than the times at which the "1" level periods of the scanning pulses $V_{y1}$, $V_{y2}$ . . . and $V_{yM}$ are terminated. The period of time $T_F$ may be a period sufficient to discharge the voltage of the scanning pulse-applied line from the "1" level to the "0" level through the switches 4. It may be set at a value which lies within a horizontal blanking period (10μs) provided every horizontal scanning period. The timing relations of the horizontal scanning pulses and the vertical scanning pulses are the same as in the case of FIG. 2, and composite signals $S^1$ and $S^2$ for pairs of rows can be obtained in combinations differing for the respective field by the same operation as explained for the embodiment of FIG. 1.

As described above in detail, in the solid-state image pickup device of the invention, four, the first (4-1) to the fourth (4—4), interlacing change-over switch MOSTs are connected to the outputs of each of the unit circuits constituting the vertical scanning circuit, and the first (4-1) and second (4-2) MOSTs and the third (4-3) and fourth (4—4) MOSTs are respectively rendered conductive during the first field and in the second field, thereby making it possible to carry out the interlaced scanning in which pairs of rows are selected in combinations differing for the respective fields. Although, according to the invention, the interlacing change-over switch MOSTs increase by four each of the unit circuits constituting the vertical scanning circuit, the number of stages of the unit circuits constituting the vertical scanning circuit is reduced by one-half by performing the interlacing, and hence, the number of constituent elements for the entire vertical scanning circuit, including the interlacing circuit, is decreased. The pitch of picture elements has hitherto been suppressed by the pitch of one stage of the vertical scanning circuit having a large number of constituent elements. Since the pitch per stage of the vertical scanning circuit can be reduced by the construction of the invention, the pitch of the picture elements is decreased and the resolution power is improved. The yield percentage in the fabricating process is also enhanced.

The layout design of the interlaced scanning circuit of the solid-state image pickup device of the invention was investigated. As a result, by employing 3μm fabrication technology generally adopted at present (a layout design in which the channel length of a MOST is made 3μm), the repeated dimensions in the Y direction could be suppressed to 12μm by arranging the four switches in two rows and two columns. When the layout was conducted with the same layout method, the repeated dimensions became 4μm greater due to an increase of one MOST. Where 500 picture elements are accommodated in an image sensing area corresponding to a ⅔-inch vidicon presently used in television broadcasting (having frame dimensions of 8.5 mm [X direction]×6.4 mm [Y direction]), the pitch of the picture elements permitted in the Y direction becomes 12.8μm or less. The layout pitch of the interlacing circuit of the invention is as small as 12μm and it becomes possible to satisfactorily arrange 500 picture elements in an image sensing area of ⅔-inch. Accordingly, the solid-state image pickup device of the invention capable of performing the interlacing with the extremely simple construction has a very high practical value.

Although, in the foregoing embodiments, MOS field-effect transistors have been referred to as the constituent elements, it is needless to say that the solid-state image pickup devices can be constructed by the use of junction field-effect transistors, bipolar transistors, etc., without departing from the subject matter of the invention.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In an image pickup device having
   a plurality of photoelectric conversion elements arranged in a two-dimensional pattern,
   horizontal and vertical switching means for selectively energizing said photoelectric conversion elements, and
   horizontal and vertical scanning means for controlling the respective horizontal and vertical switching means,
   the improvement wherein said vertical scanning means comprises
   means for selecting pairs of row lines and being composed of a unit circuit including four switches coupled to respective trios of said row lines and
   means for applying a first field change-over signal to two of said four switches and for applying a second change-over signal to the other two switches of said four switches.

2. In a solid-state image pickup device having, monolithically integrated on a semiconductor substrate,
   photoelectric conversion elements arranged in a two-dimensional pattern,
   groups of horizontal and vertical switches for selectively energizing said photoelectric conversion elements,
   a horizontal scanning circuit, and
   a vertical scanning circuit for turning the switches "on" and "off",
   said device effecting interlaced scanning in which pairs of row lines are simultaneously selected, in combinations differing for respective fields, by field pulses, the improvement comprising first to fourth switches connected to an output of each of unit circuits constituting said vertical scanning circuit, means for applying first and second field change-over pulses respectively on said first and second switches and on said third and fourth switches, and wherein said first and second switches and said third and fourth switches are respectively operated during a first field and during a second field, by said field change-over pulses and scanning pulses delivered from said vertical scanning circuit in time sequence, to thereby switch said groups of vertical switches.

3. The improvement according to claim 2, wherein said first to fourth switches and said vertical switches are constructed of MOS field-effect transistors each having a source, a drain, and a gate.

4. The improvement according to claim 3, wherein
the sources of said first to fourth switches are connected to the output of the corresponding one of said unit circuits constituting said vertical scanning circuit, the drain of said first switch, the drains of said second and third switches and the drain of said fourth switch are respectively connected to gates of the groups of vertical switches in a first row, a second row and a third row corresponding to said unit circuit, and said field change-over pulses are impressed on the gates of said first to fourth switches.

5. The improvement according to claim 3, wherein
the gates of said first to fourth switches are connected to the output of the corresponding one of said unit circuits constituting said vertical scanning circuit, the sources of said first and second switches and the sources of said third and fourth switches are respectively connected to terminals for impressing said first and second field change-over pulses, and the drain of said first switch, the drains of said second and third switches and the drain of said fourth switch are respectively connected to gates of the groups of vertical switches in a first row, a second row and a third row corresponding to said unit circuit.

* * * * *